UNITED STATES PATENT OFFICE.

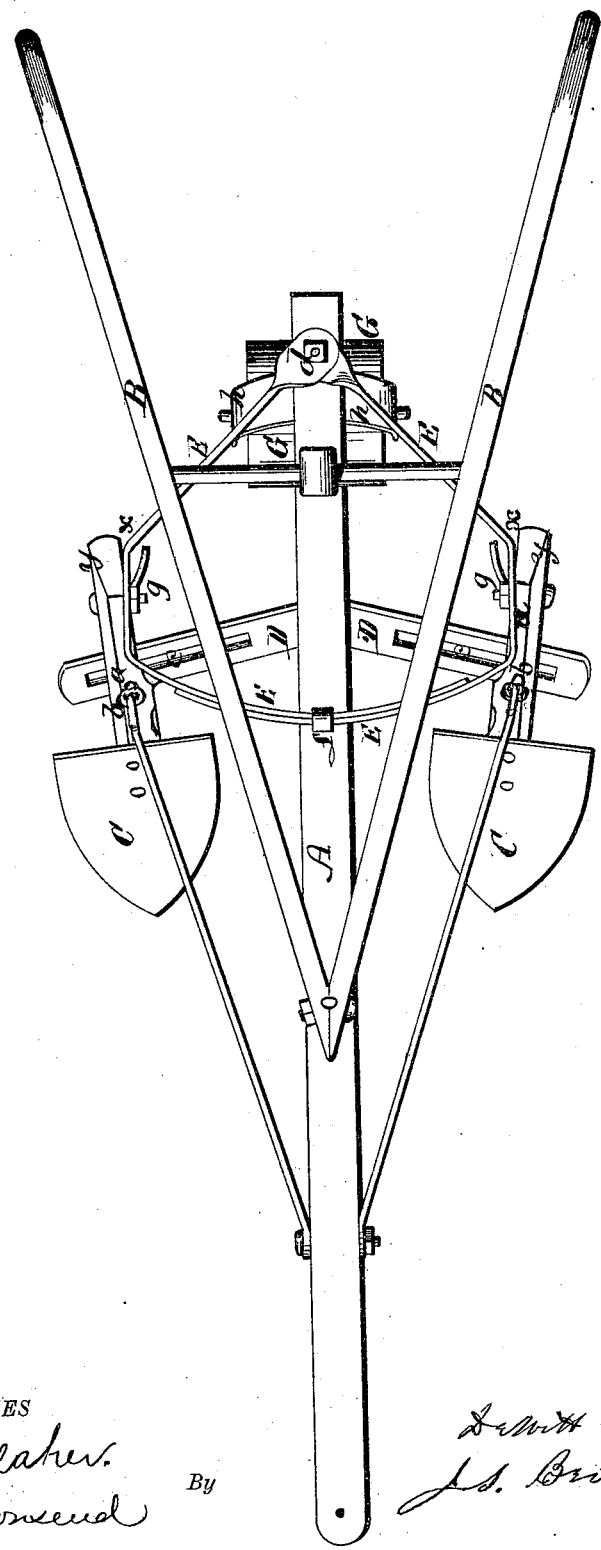

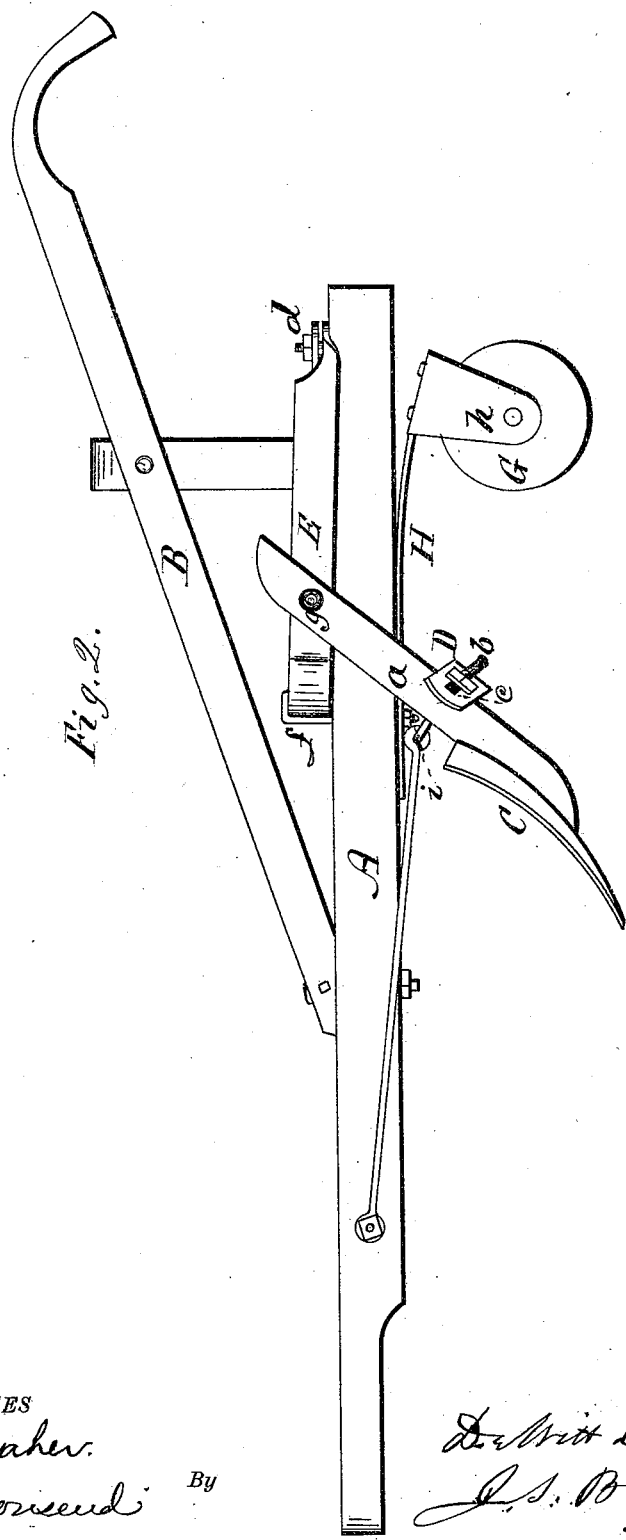

DEWITT C. BAKER, OF FULTON, NEW YORK.

IMPROVEMENT IN CULTIVATORS.

Specification forming part of Letters Patent No. 179,089, dated June 27, 1876; application filed April 21, 1875.

*To all whom it may concern:*

Be it known that I, DEWITT C. BAKER, of Fulton, in the county of Oswego and State of New York, have invented an Improved Combined Cultivator and Planter; and I do hereby declare that the following is a full and exact description thereof, reference being had to the accompanying drawings, making part of this specification—

Figure 1 being a top view of the improved cultivator and planter; Fig. 2, a side view of the same.

Like letters designate corresponding parts in both figures.

In the drawings, A represents the central beam of the implement; B B, the handles, and C C two side shovels. When the implement is used as a cultivator there is a middle shovel (not shown in the drawings) directly under the beam A, and this middle shovel may either be behind the side shovels, under the rear end of the beam, or forward of the side shovels, which, then, are even with the rear end of the beam. The beam and parts attached thereto are so constructed and arranged that the change in the relative positions of the middle and side shovels is made by simply unscrewing the fastening-bolts which secure the parts, and, after the change in the positions is made, reinserting them, and again screwing them up. The side shovels C C are attached by their standards *a a* to a bent bar, D, as shown, by means of bolts *b b*, passed through the standards and through the longitudinal slots *c c* in the said bar, and they are adjusted nearer to or farther from the beam by loosening the nuts on the bolts and moving the bolts laterally in the said slots, and then tightening the nuts again. The points of the shovels, and their inclinations inward or outward, are adjusted and fixed by means of two adjusting-irons E E, formed substantially as represented. These irons are pivoted at one end of each to a bolt, *d*, passed through the beam; their other ends are bent and extend inward in a curve concentric with their pivot-bolt *d*, and lap by each other, where they are held in position, by a hook, gripe, or guide-staple, *f*, which is passed and drawn down through the beam, and held by a nut or other suitable means. To the outer sides of these irons, respectively, are attached the upper parts of the shovel-standards by bolts *g g*. These irons are adjusted out and in, as desired, thereby varying the distance of the upper ends of the standards from the center line, over the beam, at pleasure, to correspond with the adjustment of the standards on the bar D.

The inclinations of the shovels C C to or from the center line of the implement, or straight forward, are adjusted by the following means: The upper ends of the standards *a a* have, on one side of each at the top, (rights and lefts to each other,) an inclined or chamfered surface, from the back to the front side. The opposite side *y* of each standard is at right angles to the front and rear sides.

With this construction, when the shovels C C are to be inclined inward the standards are placed outside of the adjusting-arms E E, with their inclined sides *x x* thereto, and to be secured thus thereto, as shown most clearly in Fig. 1. In this arrangement the bent bar D is placed, as shown in the same figure, with the inner side of its bend forward, the angle of the bend corresponding very nearly with the inclinations of the said chamfered or bevel sides of the standards; but when the shovels are to be inclined outward the standards *a a* are shifted to opposite sides of the implement, and placed inside of the respective adjusting wing-irons E E, with the inclined sides *x x* contiguous thereto. The bent bar D is then placed with the outside of its bend forward; and if the shovels are to be set at right angles, or nearly so, to the line of motion, the standards are secured to the adjusting-irons E E, either outside or inside thereof, with their right-angled sides *y y* contiguous thereto.

In using this implement for covering seed, such as potatoes, and rolling the ground after the covering, it is arranged as shown in the drawings. The side shovels C C are adjusted in the right position to turn the earth in over the seed to cover the same. The middle shovel is taken off, and in its stead a roller, G, for rolling the ground, is employed, being mounted in bearings *h h* of a spring attachment, H, which is secured to the under side of the beam, as shown, by a bolt or bolts, *i*. Thus the roller has a spring-pressure on the ground, and adapts itself to the irregular surface thereof.

The spring attachment may be varied from the construction herein shown, provided the same result is accomplished.

What I claim as my invention, and desire to secure by Letters Patent, is—

1. The combination of the shovel-standards $a\ a$, having inclined sides $x\ x$ and right-angled sides $y\ y$, the adjusting wing-irons E E, and the slotted bent bar D, substantially as and for the purpose herein specified.

2. A cultivator constructed with a central beam, A, as set forth, and with shovels C C, arranged as described, and provided with a roller, G, attached thereto by means of a spring, H, substantially as and for the purpose herein specified.

Specification signed by me this 22d day of February, 1875.

DEWITT C. BAKER.

Witnesses:
 E. R. HUGGINS,
 A. C. WARNER.